June 12, 1945.     E. R. DETRICK     2,377,997

TRIM PANEL

Original Filed July 29, 1940

INVENTOR.
EDWARD R. DETRICK
BY
*Whittemore, Hulbert & Belknap*
ATTORNEYS

Patented June 12, 1945

2,377,997

UNITED STATES PATENT OFFICE 2,377,997

TRIM PANEL

Edward R. Detrick, Detroit, Mich., assignor to National Automotive Fibres, Inc., Detroit, Mich., a corporation of Delaware Original application July 29, 1940, Serial No. 348,291. Divided and this application September 27, 1943, Serial No. 503,993

10 Claims. (Cl. 45—138)

This invention relates generally to trim panels, especially decorated trim panels for the interior of doors and other portions of vehicle bodies, and constitutes a division of my application filed July 29, 1940, bearing Serial No. 348,291, now Patent No. 2,334,811.

It has been suggested in the past to cover trim panels and other interior trim of automotive vehicles with fabrics of different colors or shades so as to provide a two-tone or multiple-tone effect. In the past this has been accomplished by sewing the two fabrics together to provide a composite fabric, which may then be applied to trim panels or other interior portions of the vehicle. The sewed seam between the two different fabrics presented an unattractive appearance, and efforts were made to conceal this seam in the past. One manner of concealing the seam was to provide a metal molding strip which was tacked through the fabric to the panel board and was intended to overlie and conceal the seam. Obviously the seam had to be perfectly straight, and while there was no difficulty in sewing straight seams, application of the composite fabric to the panel board had to be carried out with extreme care, so that the seam could be covered by a narrow strip of molding metal.

According to the present invention, two pieces of fabric which are to be united for a composite interior trim fabric are connected by means of a metal strip of a particular design, as will subsequently be pointed out. As a result, this strip insures that the seam or line of juncture between the pieces of fabric will be straight both before and after the composite fabric has been applied to the panel board.

In addition, this metal strip serves as a reinforcing means for the panel, so that by employing my improved construction it is possible to use a lighter and therefore less expensive foundation panel board.

A number of different effects may be obtained by slightly modified forms of metallic securing strip, however at the present time it is sufficient to mention that by employing my improved metallic locking strip, it is possible to obtain the effect of a metal molding strip. If preferred, it is possible to obtain the effect of a straight seam without an exposed, intervening metallic molding strip. It is further possible to obtain a bead or riser intermediate two pieces of fabric which is covered with a different contrasting or harmonizing fabric.

It may also be pointed out that, if desired, the molding strip may be curved to any desired configuration so as to obtain different decorative designs.

With the foregoing general remarks in mind, it is an object of the present invention to provide two-tone trim panels of novel characteristics.

It is a further object of the invention to provide novel means for securing two pieces of fabric together.

It is a further object of the invention to provide trim panels characterized by the provision of contrasting or harmonizing fabrics in conjunction with an exposed metallic or fabric covered riser of novel design.

It is a further object of the invention to provide a trim panel provided with reinforcing metallic strips, which also were utilized to interlock adjacent pieces of trim fabric.

It is a further object of the present invention to provide a fabric having a stiff bead permanently united to one edge thereof along a line which may be straight or of predetermined curvature.

Other objects of the invention will be apparent as the description proceeds, and when taken in conjunction with the accompanying drawing, wherein.

Figure 1:
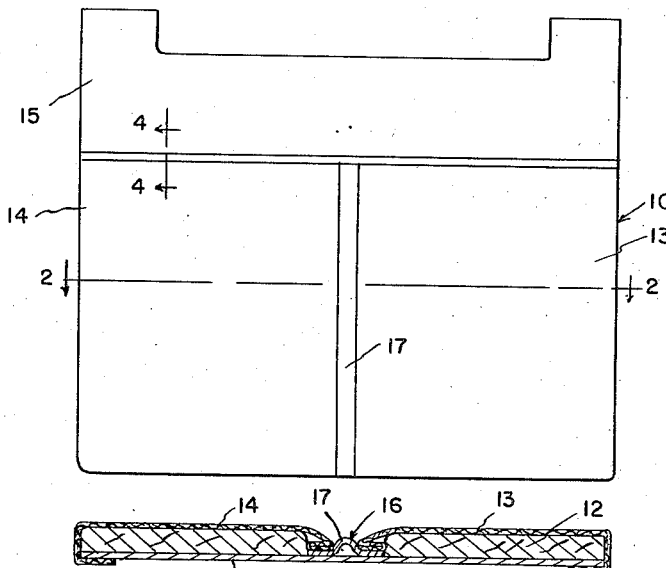
Figure 1 is a front elevation of a trim panel illustrating the possible design which may be obtained by the present invention.
Figure 2:
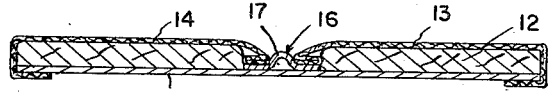
Figure 2 is a section on the line 2—2, Figure 1.

Referring first to Figures 1 and 2, I have illustrated generally at 10 an upholstered trim panel comprising a panel board 11, padding material 12, trim fabrics 13, 14 and 15, and the metallic locking strip 16.

It will be understood that the padding material 12 may be of any desired type, and it may be well at this time to mention briefly the construction of the panel. The foundation panel board 11 may be an asphalt board or a panel board sold under the trade name Masonite. The padding material 12 may be wadding of a suitable type, or it may be loosely aggregated cotton, jute, or other fibrous material. The purpose of the padding material is to give an appearance of richness to the completed panel which is otherwise not obtained.

Panels of this type are adapted to be secured to doors of vehicles and it is to be understood that while I have illustrated my invention as applied to a trim panel for attachment to a door, the invention is not thus limited. The invention may be applied to other panels, and in fact, as will be obvious, its application is more or less general. Thus it may be used for decorative trim in vehicles, homes, stores, theatres and the like.

By way of example, the trim panel illustrated in Figures 1 and 2, may be covered by a composite trim fabric made up of the fabric pieces 13, 14 and 15. The upper pieces 15 may, for example, be of a dark tone, whereas the pieces 13 and 14 may be of a harmonizing or contrasting color or shade. The metallic strip 16 has a bead or riser 17 intermediate the pieces of fabrics 13 and 14 which is exposed and which may, of course, be chromium plated or otherwise treated to present an attractive appearance.

Figure 3:
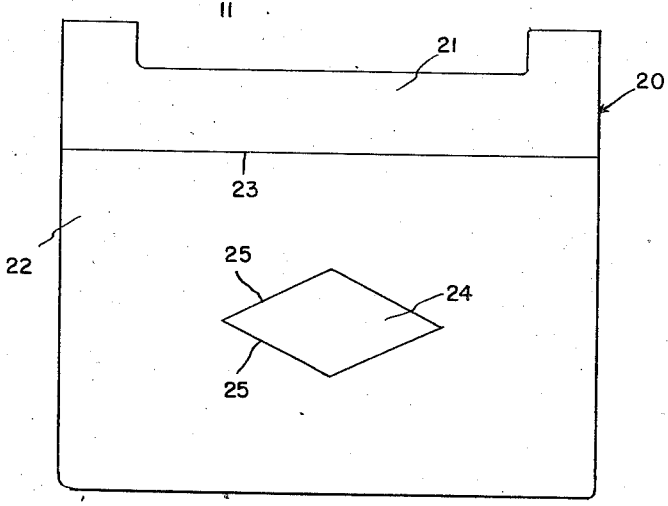
Figure 3 is a front elevation illustrating a somewhat different specific design of trim panel.

In Figure 3 I have illustrated a somewhat different design for the purpose of indicating the flexibility of the present invention. In this case the trim panel indicated generally at 20 may be covered with a composite trim fabric comprising an upper portion 21, which may be of a definite color, and a lower portion 22 which may be of a harmonizing or contrasting color. The pieces 21 and 22 are secured together along the line 23, a metallic strip of the type disclosed herein being employed. Intermediate the lower portion 22 I provide a decorative fabric insert 24 which may be of the same color as the upper portion 21, or of a different harmonizing or contrasting color. The lines of conjuncture 25 between the insert 24 and the fabric 22 are formed by metallic strips of the type disclosed herein, as will later be pointed out.

It may be stated at this time that while the invention is most readily practiced in a manner to provide straight-line seams of the conjunctures, it need not be limited thereto, and it is within the contemplation of the present invention that the metallic strip may be curved transversely to provide curved or irregular lines of conjunctures between the various pieces of fabric.

Figure 4:
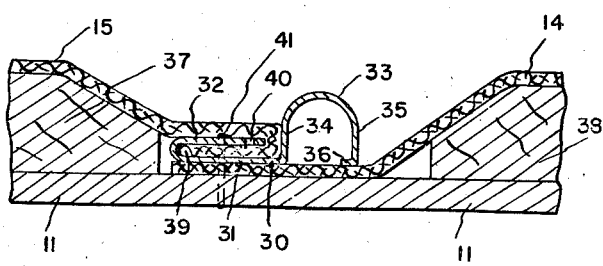
Figure 4 is a sectional view taken substantially on the line 4—4 of Figure 1.

Referring now to Figure 4, I have illustrated a method of employing the strips. In Figure 4 I have indicated in section a strip 30 which is made of a light bendable metal. I have found that excellent results are obtained where these strips are formed of brass, but it is obvious that any suitable material may be employed. I prefer to employ metal, but it is entirely possible that other materials, such for example as suitable resins, might be employed. Thus, for example, resins might be formed to the same shape as the metallic strips, and the interlock between the fabrics and the strips could be obtained by the application of heat to the resin strips.

I have found that where brass is employed as the material from which the strips 30 are formed, best results are obtained when the strip is between .010 and .015 inch in thickness. Obviously the thickness of the strip is not critical, and will be selected with well-known practice and in accordance with the specific material employed.

As previously stated, by employing my improved metal locking strip, it is possible to use a lighter gauge panel board 11, for the reason that the metal strip 30 serves as a reinforcing means which strengthens and lends certain rigidity to the panel board. It will be understood, of course, that the light gauge strips 30 are not themselves extremely rigid and will conform to the curvature of the panel board when the same is required to assume a curvature during its application.

As illustrated in Figure 4, the strip 30 has a base portion 31 provided at one longitudinal edge thereof with an open return bent flange 32 and provided at the other longitudinal edge with a raised hollow bead or riser 33. Preferably one side wall 34 of the bead 33 is spaced laterally from the free edge of the flange 32, while the other side wall 35 of said bead is provided at its lower free edge with an inturned flange 36.

The trim fabric 14 extends beneath the strip 30 and rests upon the panel board 11 between laterally spaced portions 37 and 38 respectively of padding material. The base 31 and flange 36 of the strip 30 rest upon this fabric 14 and hold it in place, as will be hereinafter more fully described.

The trim fabric 15 extends over the return bent flange 32 of the strip and has an inturned or folded edge portion 39 at one side of the bead 33 extending between and clamped by the base 31 and return bent flange 32 of the strip. As desired, tangs 40 may be struck out from the flange 32, or from the base 31 of the strip to pierce and hold the inturned edge portion 39 of the fabric against displacement relative to the strip. Also suitable fastening elements such as staples 41 may extend through the return bent flange 32 of the strip, inturned edge portion 39 of the fabric, base 31 of the strip and fabric 14 for engagement with the panel board 11 to hold the parts in assembled relation.

The metallic strips previously described may be very cheaply constructed and the metal employed in them is, of course, very inexpensive. As a result, the material going to make up the trim panel is no more expensive than present day constructions which lack the flexibility of design in the present construction. In addition, the present strips lend themselves to very rapid assembly and do not require highly skilled labor. As a result, the labor costs of assembling the completed panels is no more expensive than present less attractive panels, and is in fact considerably less expensive than present types of assembly which obtain anything like equivalent results.

Reference was previously made to the fact that instead of employing metallic strips, strips of other material could be employed. By employing metallic strips the interlock formed by the tangs 40 is exceptionally efficient, but in its broader aspects, the invention need not be practiced with metallic strips. If a strip of resinous material or adhesive coated bendable cardboard were employed, it would still be possible to obtain perfectly straight seams having straight folded edges, which is very desirable in this type of construction. If the strips were formed of resinous material, the sealing bond could be obtained by the application of heat to the fabric overlying the folded strips. If adhesive were employed, it would be necessary only to apply sufficient pressure to cause initial setting of the adhesive.

It may also be mentioned that rubber may be employed as the locking medium. Thus, for example, the strips may be formed of any suitable material and provided with thin unvulcanized rubber coatings, or provided with a film of vulcanizing latex. The final assembly of the operation would then include the application of heat and pressure to vulcanize the rubber, thus forming a perfect bond between the strips and fabrics.

What I claim as my invention is:

1. In a trim structure, a panel board, a trim fabric on said panel board, a metal strip having a base on said trim fabric provided at one longitudinal edge with an open return bent flange and provided at its other longitudinal edge with a raised bead, a trim fabric extending over the return bent flange and provided at one side of the bead with an inturned edge portion anchored between the base and flange of the strip, and means holding the parts aforesaid in assembled position, including means engaging portions of the strip, both fabrics and the panel board.

2. In a trim structure, a panel board, padding material spaced apart on said panel board and cooperating therewith to provide an outwardly opening channel shaped recess, a trim fabric extending over the padding material upon one side of the recess and having an edge portion engaging in surface to surface relation the panel board at the bottom of said recess, a molding strip within said recess having a substantially flat base portion resting upon said edge portion of the fabric and having a raised hollow bead opening toward said edge portion, the base portion having an open return bent flange extending toward but terminating short of the adjacent side of said bead, the other side of said bead having an inturned flange resting upon said edge portion of the fabric, another trim fabric extending over the padding material upon the other side of said recess and over the return bent flange and having an inturned edge portion extending between said flange and adjacent side of said bead and anchored between the base portion and return bent flange of said molding strip, and means concealed by at least one of said fabrics and engaging the panel board for holding the parts in assembled relation, including a securing element extending through the return bent flange and base portion of the molding strip and through the edge portions aforesaid of both fabrics and anchored to said panel board.

3. In a trim structure, a panel board, a trim fabric having an edge portion engaging the panel board, a molding strip having a substantially flat base portion resting upon said edge portion of the fabric and having a raised hollow bead opening toward said edge portion, the base portion having an open return bent flange extending toward but terminating short of the adjacent side of said bead, the other side of said bead having an inturned flange resting upon said edge portion of the fabric, another trim fabric extending over the return bent flange and having an inturned edge portion extending between said flange and adjacent side of said bead and anchored between the base portion and return bent flange of said molding strip, and means concealed by at least one of said fabrics and engaging the panel board for holding the parts in assembled relation, including a securing element extending through the return bent flange and base portion of the molding strip and through the edge portions aforesaid of both fabrics and anchored to said panel board.

4. In a trim structure, a panel board, padding material spaced apart on said panel board and cooperating therewith to provide an outwardly opening channel shaped recess, a trim fabric extending over the padding material upon one side of the recess and having an edge portion engaging in surface to surface relation the panel board at the bottom of said recess, a molding strip within said recess having a substantially flat base portion resting upon said edge portion of the fabric and having a raised hollow bead opening toward said edge portion, the base portion having an open return bent flange extending toward but terminating short of the adjacent side of said bead, another trim fabric extending over the padding material upon the other side of said recess and over the return bent flange and having an inturned edge portion extending between said flange and adjacent side of said bead and anchored between the base portion and return bent flange of said molding strip, and means concealed by at least one of said fabrics and engaging the panel board for holding the parts in assembled relation.

5. In a trim structure, a panel board, a trim fabric having an edge portion engaging the panel board, a molding strip having a substantially flat base portion resting upon said edge portion of the fabric and having a raised hollow bead opening toward said edge portion, the base portion having an open return bent flange extending toward but terminating short of the adjacent side of said bead, another trim fabric extending over the return bent flange and having an inturned edge portion extending between said flange and adjacent side of said bead and anchored between the base portion and return bent flange of said molding strip, and means concealed by at least one of said fabrics and engaging the panel board for holding the parts in assembled relation.

6. In a trim structure, a panel board, a trim fabric having a portion on said panel board, a metal strip having a base on said trim fabric, said base being provided at one longitudinal edge with an open return bent flange and provided at another longitudinal edge with a raised bead, a trim fabric extending over the return bent flange and provided at one side of the bead with an inturned edge portion extending between the base and flange of the strip, and means holding the trim fabrics and metal strip on the panel board, including an element concealed by one of said trim fabrics and engaging the other of said trim fabrics and said strip.

7. In a trim structure, a panel board, a trim fabric having a portion on said board, a strip having a raised bead on said portion, a trim fabric having an inturned portion at one side of said bead, said strip having opposed portions embracing the inturned portion of the last mentioned fabric, and means holding the trim fabrics and strip in assembled relation on said panel board, including means engaging the panel board and at least the opposed portions of said strip.

8. In a trim structure, a panel board, a trim fabric having an edge portion on said panel board, a molding strip having a base and a raised bead on said edge portion of the fabric, the base of the strip having a return bent flange spaced from said bead, a trim fabric extending over the return bent flange of the strip and having an inturned edge portion between the base and return bent flange of the strip, and means connecting the edge portion of the first mentioned fabric, the inturned edge portion of the second mentioned fabric, and the base and return bent flange of the strip to said panel board.

9. In a trim structure, a panel board, a trim fabric having an edge portion on said panel board, a molding strip having a base on said edge portion of the fabric, and having a raised hollow bead opening toward and having an inturned flange on said edge portion of the fabric, the base of the strip having a return bent flange spaced from said bead, a trim fabric extending over the return bent flange of the strip and having an inturned edge portion between the base and return bent flange of the strip, and means connecting the edge portion of the first mentioned fabric, the inturned edge portion of the second mentioned fabric, and the base and return bent flange of the strip to said panel board.

10. In a trim structure, a panel board, padding material spaced apart on said panel board and cooperating therewith to provide an outwardly opening channel shaped recess, a trim fabric extending over the padding material upon one side of said recess and having an edge portion engaging in surface to surface relation the panel board at the bottom of said recess, a molding strip within said recess having a substantially flat base portion resting upon said edge portion of the fabric and having a raised hollow bead opening toward said edge portion of the fabric, the base portion of said strip having an open return bent flange extending toward but terminating short of the bead, a trim fabric extending over the padding material upon the other side of said recess and over the return bent flange and having an inturned edge portion extending between the base and return bent flange of said strip, and means connecting the edge portion of the first mentioned fabric, the inturned edge portion of the second mentioned fabric, and the base and return bent flange of the strip to said panel board.

EDWARD R. DETRICK.